United States Patent [19]

Sebillotte

[11] Patent Number: 4,685,587

[45] Date of Patent: Aug. 11, 1987

[54] PRESSURE COOKER EQUIPPED WITH A SAFETY DEVICE FOR PRODUCING CONTROLLED LEAKAGE OF THE SEALING GASKET

[75] Inventor: Christian Sebillotte, Selongey, France

[73] Assignee: Seb S.A., Selongey, France

[21] Appl. No.: 888,483

[22] Filed: Jul. 23, 1986

[30] Foreign Application Priority Data

Jul. 26, 1985 [FR] France .................. 85 11471

[51] Int. Cl.[4] .............................. B65D 45/00
[52] U.S. Cl. ................................ 220/316; 220/295
[58] Field of Search ............ 220/316, 361, 367, 202, 220/203, 208, 209, 295; 292/256.6; 277/11, 180

[56] References Cited

U.S. PATENT DOCUMENTS

| 4,251,007 | 2/1981 | Behnisch | 220/316 |
| 4,434,909 | 3/1984 | Ott | 220/316 |
| 4,541,543 | 9/1985 | Elexpuru | 220/316 |

FOREIGN PATENT DOCUMENTS

| 877056 | 5/1953 | Fed. Rep. of Germany . |
| 1078364 | 10/1955 | France . |
| 1193541 | 11/1959 | France . |
| 1334877 | 1/1962 | France . |
| 682345 | 11/1952 | United Kingdom . |

Primary Examiner—George T. Hall
Attorney, Agent, or Firm—Young & Thompson

[57] ABSTRACT

A pressure cooker in which a pressure vessel (1) and a lid (2) are associated with each other by means of a bayonet-type closure system (4, 5) is provided with a sealing gasket (3) fitted between the pressure vessel and the lid and with a controlled leakage device having a push-rod (8) mounted on the lid (2). The sealing gasket (3) has at least one groove (11) parallel to one edge of the gasket in a lateral face which is directed towards the pressure vessel (1) externally of this latter. When the sealing gasket (3) is displaced by the push-rod (8), the groove (11) establishes a calibrated leakage flow between the interior and the exterior of the pressure vessel.

5 Claims, 5 Drawing Figures

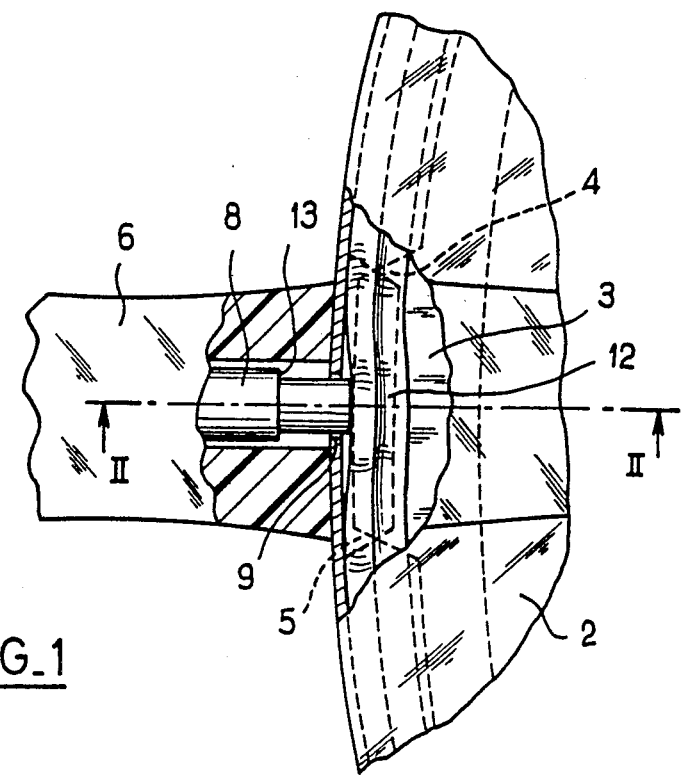
FIG_1
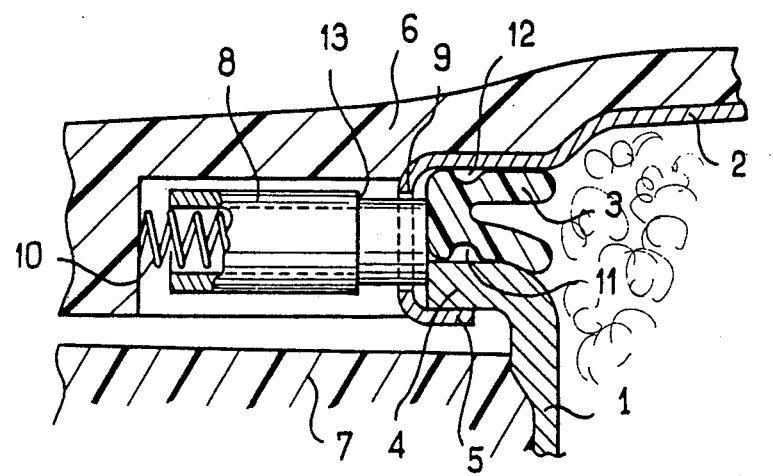
FIG_2

PRESSURE COOKER EQUIPPED WITH A SAFETY DEVICE FOR PRODUCING CONTROLLED LEAKAGE OF THE SEALING GASKET

BACKGROUND OF THE INVENTION

The present invention relates to a pressure cooker equipped with a device for producing controlled leakage of the sealing gasket.

It is known that, in order to guard against abrupt escape of steam when the user inadvertently opens the pressure cooker without having initially caused a pressure drop within this latter, safety devices are usually provided for producing a controlled steam release as soon as a movement of opening of the pressure cooker is initiated. A safety device of this type also serves to prevent a pressure rise within the pressure cooker if this latter is incorrectly closed.

In particular, in the case of pressure cookers provided with a bayonet closure system, one of the safety devices employed is a push-rod which is mounted on the side of the lid and usually placed within the lid handle. Said push-rod passes through a lateral opening of the lid opposite to one of the bayonet-type lid closure elements and is thrust by restoring means towards the sealing gasket between the lid and the pressure vessel. In the closed position of the pressure cooker, the push-rod is thrust back by one of the vessel closure ramps in opposition to the action of restoring means and the lid-opposition sealing function is fully performed by the gasket. When the lid is incorrectly closed or at the initial moment of opening of the pressure cooker, the push-rod moves away from the closure ramp and exerts an inward thrust on the sealing gasket, thus producing leakage between the sealing gasket and the pressure vessel. The result thereby achieved respectively in these two cases is that a pressure rise within an incorrectly closed pressure cooker is prevented or that the pressure within the pressure cooker is restored to atmospheric pressure before the lid is completely opened.

However, by reason of the manufacturing tolerances of the different components (pressure vessel, lid, sealing gasket and push-rod restoring spring), the leakage thus produced by existing devices is liable to vary to an appreciable extent. The leakage may thus be insufficient, in which case it would cause a pressure rise or else have the effect of maintaining a residual pressure within the pressure cooker. Alternatively, the leakage may be excessive and this would result in a substantial release of steam which would be dangerous for the user at the time of opening of a pressure cooker under pressure.

SUMMARY OF THE INVENTION

One object of the present invention is to propose a pressure cooker equipped with a device for producing controlled leakage of the sealing gasket in which the leakage flow rate is approximately constant irrespective of the manufacturing tolerances of the pressure cooker components.

To this end, a pressure cooker in accordance with the invention is constituted by a pressure vessel, a lid, a sealing gasket between the pressure vessel and the lid, guide ramps formed respectively on the edge of the pressure vessel and on the edge of the lid and adapted to cooperate with each other in order to provide a bayonet closure system, a device having the function of producing controlled leakage of the gasket and provided with a push-rod mounted on the lid so as to pass through a lateral opening of said lid and to exert a thrust on the sealing gasket under the action of restoring means, said push-rod being retained by a guide ramp of the pressure vessel when the lid is completely closed. Said push-rod has the effect of thrusting the gasket towards the interior of the pressure vessel when the lid is incompletely closed and when said push-rod is no longer retained by said guide ramp. The distinctive feature of the invention lies in the fact that the sealing gasket has at least one groove parallel to one edge of said gasket and formed on one gasket face adjacent to that edge of the pressure vessel which is provided with said guide ramps. The position of said groove with respect to the edge of the pressure vessel is such that, when the lid is completely closed, said groove is applied against the guide ramps which project externally of the pressure vessel and communicates with the external atmosphere in the intermediate zones between the ramps, said groove being intended to communicate with the interior of the pressure vessel when the lid is incompletely closed and when the sealing gasket is thrust by the push-rod towards the interior of said pressure vessel.

Thus, when the pressure cooker is correctly closed, the sealing gasket normally performs its function and the pressure cooker can be put under pressure. On the contrary, when the pressure cooker is opened or when it is incorrectly closed, the push-rod of the safety device exerts a local thrust on the sealing gasket so as to push this latter towards the interior of the pressure vessel and the groove of the sealing gasket then establishes a calibrated communication between the interior of the pressure vessel and the exterior of this latter.

In a preferred embodiment of the invention, the sealing gasket has an external heel provided with two sealing lips directed towards the interior of the pressure vessel and the groove is formed near the gasket heel. The groove is thus formed in a relatively rigid portion of the sealing gasket, thus ensuring a certain dimensional stability of the groove.

In an advantageous embodiment of the invention, the groove has a semicircular cross-section. Said groove thus provides a wide external opening and the leakage flow rate is adjusted by the cross-section of the groove located directly above the edge of the pressure vessel.

In a preferred embodiment of the invention, the sealing gasket is provided with a groove in each lateral face. Thus, at the time of fitting of the gasket in the lid, there is no need for concern as to the direction in which the gasket is mounted.

According to another preferred aspect of the invention, the push-rod of the safety device has an annular shoulder located opposite to one edge of the lateral opening of the lid. By means of said annular shoulder, the movement of the push-rod is thus determined with accuracy and the portion of gasket which extends outwards from the groove is thus prevented from being thrust back towards the interior of the pressure vessel.

BRIEF DESCRIPTION OF THE DRAWINGS

These and other features of the invention will be more apparent to those versed in the art upon consideration of the following description and accompanying drawings, wherein:

FIG. 1 is a fragmentary top view of a pressure cooker in accordance with the invention as shown in the closed position;

FIG. 2 is a sectional view taken along the plane II—II of FIG. 1;

DESCRIPTION OF THE PREFERRED EMBODIMENTS

Figure 3:
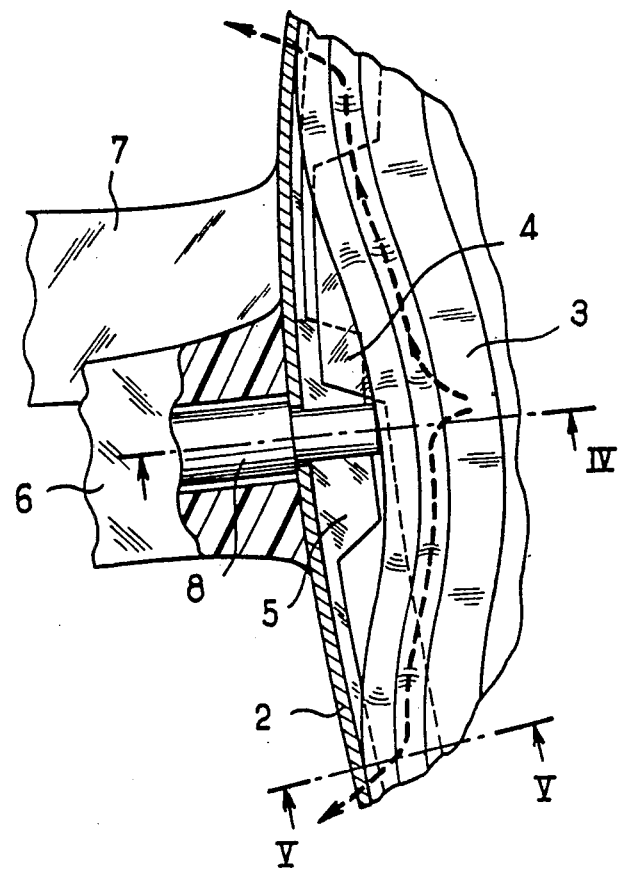
FIG. 3 is a top view which is similar to that of FIG. 1 in an inadequately closed or semi-open position of the pressure cooker.

Reference being made to the figures, the pressure cooker in accordance with the invention is of conventional design and accordingly consists of a pressure vessel 1 equipped with a lid 2. A sealing gasket 3 is fitted between the pressure vessel 1 and the lid 2 along the edges of these latter. The pressure cooker is provided with a bayonet closure system having a series of guide ramps 4 carried by the pressure vessel and extending in the outward direction and a series of complementary guide ramps 5 carried by the lid and extending in the inward direction.

In order to permit relative displacement of the pressure vessel and lid, said lid 2 is equipped with a handle 6 and the pressure vessel 1 is equipped with a handle 7.

A device for producing controlled leakage of the sealing gasket 3 is housed within the lid handle and provided with a push-rod 8 mounted on the lid 2 so as to pass through a lateral opening 9 of said lid and to exert a thrust on the sealing gasket 3 under the action of a restoring spring 10. Said push-rod 8 is retained by a guide ramp 4 of the pressure vessel when the lid is completely closed. Said push-rod 8 thrusts the gasket towards the interior of the pressure vessel when the lid is incompletely closed and when said push-rod is no longer retained by the guide ramp.

In accordance with the invention, the sealing gasket 3 is provided with at least one groove 11 parallel to one edge of this latter and formed in a gasket face adjacent to the edge of the pressure vessel wall which is provided with the guide ramps 4. The position of said groove 11 with respect to the edge of the pressure vessel is such that, when the lid is completely closed, said groove 11 is applied against the guide ramps 4 which project externally of the pressure vessel 1 and communicate with the surrounding atmosphere in the intermediate zones located between the guide ramps. Said groove 11 communicates with the interior of the pressure vessel when the lid is incompletely closed and when the sealing gasket 3 is displaced by the push-rod 8 towards the interior of the pressure vessel.

In the embodiment shown in the drawings, the sealing gasket 3 has an external heel, said heel being so designed as to carry two sealing lips which are directed towards the interior of the pressure vessel and the groove 11 is formed in close proximity to the gasket heel.

Figure 4:
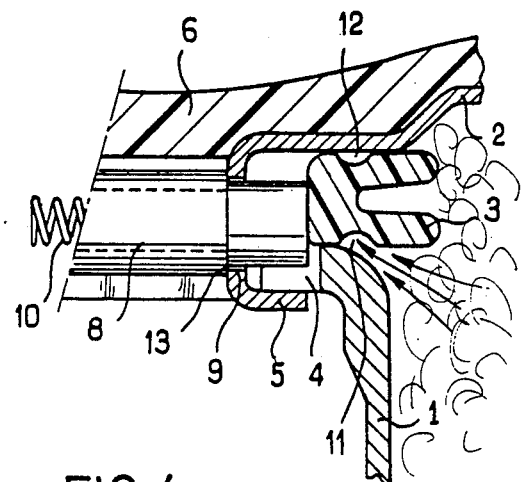
FIG. 4 is a sectional view taken along the plane IV—IV of FIG. 3.
Figure 5:
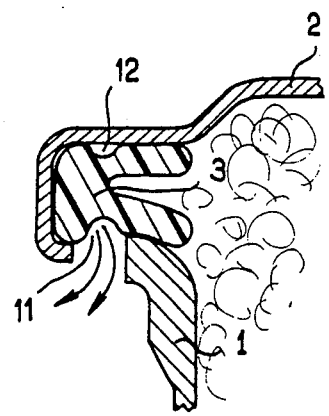
FIG. 5 is a sectional view taken along the plane V—V of FIG. 3.

It is observed in FIGS. 2, 4 and 5 that the groove 11 has preferably a substantially semicircular cross-section.

In the preferred embodiment illustrated, the sealing gasket is provided with a second groove 12 which is similar to the groove 11 but formed in the opposite lateral face of said sealing gasket 3.

The push-rod 8 is preferably provided with an annular shoulder 13 located opposite to one edge of the lateral opening 9 of the lid 2.

The operation of the device in accordance with the invention is as follows : when the pressure cooker is correctly closed as shown in FIGS. 1 and 2, the operation is identical with the usual operation of the safety device. In other words, the push-rod 8 is thrust outwards by the guide ramp 4 of the pressure vessel 1 and the sealing gasket bears on the internal edge of the pressure vessel 1 around the entire periphery of this latter, thus ensuring its sealing function and permitting pressurization of the pressure cooker. The groove 11 is then entirely located outside the pressure vessel 1.

At the time of opening or when the pressure cooker has been incompletely closed as shown in FIGS. 3 and 5, the guide ramps 4 of the pressure vessel 1 and the guide ramps 5 of the lid 2 overlap only to a partial extent and this would be liable to cause abrupt opening if the pressure cooker were put or maintained under pressure. In this case, however, the push-rod 8 is no longer maintained in the withdrawn position by the ramp 4 of the pressure vessel 1 and exerts a local thrust on the sealing gasket so as to push this latter towards the interior of the pressure vessel under the action of the restoring spring 10. By means of this movement, part of the groove 11 extends within the pressure vessel (as shown in FIG. 4) and the vapor under pressure which may be contained in the vessel circulates within the groove 11 up to the adjacent portion of gasket which is not thrust back by the push-rod 8 and which consequently has a corresponding portion of groove 11 located outside the pressure vessel as shown in FIGS. 3 and 5.

It is therefore apparent that deformation of the sealing gasket serves to establish a communication between the interior and the exterior of the pressure vessel via the groove 11. By reason of the semicircular shape of the groove 11, this latter provides a wide opening towards the interior of the pressure vessel in the thrust-back portion and towards the exterior of the pressure vessel in the adjacent portion. The steam flow rate within the groove 11 is therefore determined by the cross-sectional area of this latter at the level of steam flow above the edge of the pressure vessel 1. In contrast to the device of the prior art in which the leakage flow rate was dependent on the manner in which the push-rod 8 produced action on the sealing gasket 3, the device in accordance with the invention permits accurate control of the steam flow rate by providing the groove 11 with suitable dimensions. Furthermore, the groove 11 has the effect of guiding the steam at points remote from the handle 6, thus enabling the user to operate the handle without any risk of being burned by discharges of steam.

It is worthy of note that, during the operation described in the foregoing, the edges of the groove 12 have remained continuously in contact with the upper portion of the lid 2 and no leakage flow is produced by this latter. The function of the groove 12 is essentially to permit fitting of the sealing gasket 3 in any direction, which is conducive to higher rates of production of the pressure cooker.

Another noteworthy point is that, at the time of controlled leakage, the annular shoulder 13 of the push-rod 8 is abuttingly applied against the lateral face of the lid 2 (as shown in FIG. 4), with the result that the sealing gasket 3 is thrust back over a constant distance. In particular, that portion of the sealing gasket which is located outside the groove 11 remains in contact with the top edge of the pressure vessel 1 and prevents uncontrolled leakage at the level of the push-rod 8.

As will readily be apparent, the invention is not limited to the embodiment described in the foregoing and alternative forms of construction may accordingly be contemplated.

In particular, the grooves 11 and 12 can be given any desired cross-section. Similarly, although the sealing gasket 3 has been illustrated in the form of a U-section strip, the gasket can have any other shapes which are suited to the shape of the lid and the edge of the pressure vessel.

What is claimed is:

1. A pressure cooker constituted by a pressure vessel (1), a lid (2), a sealing gasket (3) between the pressure vessel and the lid, guide ramps (4, 5) formed respectively on the edge of the pressure vessel and on the edge of the lid and adapted to cooperate with each other in order to provide a bayonet closure system, a device having the function of producing controlled leakage of the sealing gasket (3) and provided with a push-rod (8) mounted on the lid (2) so as to pass through a lateral opening (9) of said lid and to exert a thrust on the sealing gasket (3) under the action of restoring means (10), said push-rod (8) being retained by a guide ramp (4) of the pressure vessel when the lid is completely closed, the function of said push-rod (8) being to thrust the gasket (3) towards the interior of the pressure vessel when the lid is incompletely closed and when said push-rod is no longer retained by said guide ramp (4), wherein the sealing gasket (3) has at least one groove (11) parallel to one edge of said gasket and formed on one gasket face adjacent to that edge of the pressure vessel which is provided with said guide ramps (4), the position of said groove (11) with respect to the edge of the pressure vessel being such that when the lid is completely closed, said groove (11) is applied against the guide ramps (4) which project externally of the pressure vessel (1) and communicates with the external atmosphere in the intermediate zones between the ramps, said groove (11) being intended to communicate with the interior of the pressure vessel when the lid is incompletely closed and when the sealing gasket (3) is thrust by the push-rod (8) towards the interior of said pressure vessel.

2. A pressure cooker according to claim 1 in which the sealing gasket has an external heel provided with two sealing lips directed towards the interior of the pressure vessel, wherein the groove (11) is formed near the gasket heel.

3. A pressure cooker according to claim 1, wherein the groove (11) has a semicircular cross-section.

4. A pressure cooker according to claim 1, wherein the sealing gasket (3) is provided with a groove (11, 12) in each lateral face of said gasket.

5. A pressure cooker according to claim 1, wherein the push-rod (8) has an annular shoulder (13) located opposite to one edge of the lateral opening (9) of the lid (2).

* * * * *